Oct. 21, 1924.
1,512,167
C. GORE
SPEED ARRESTER FOR VEHICLES
Filed Nov. 2, 1922
2 Sheets-Sheet 2
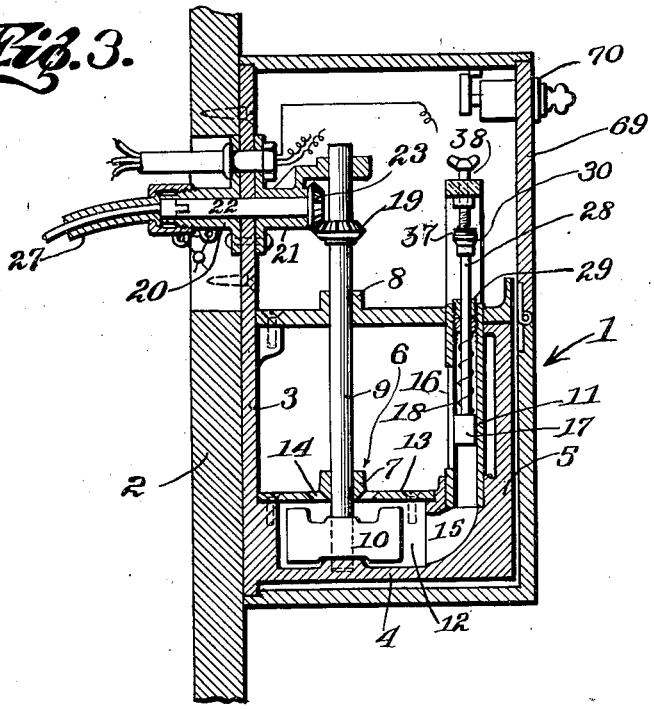
Inventor
Charles Gore;
By
Att'y.

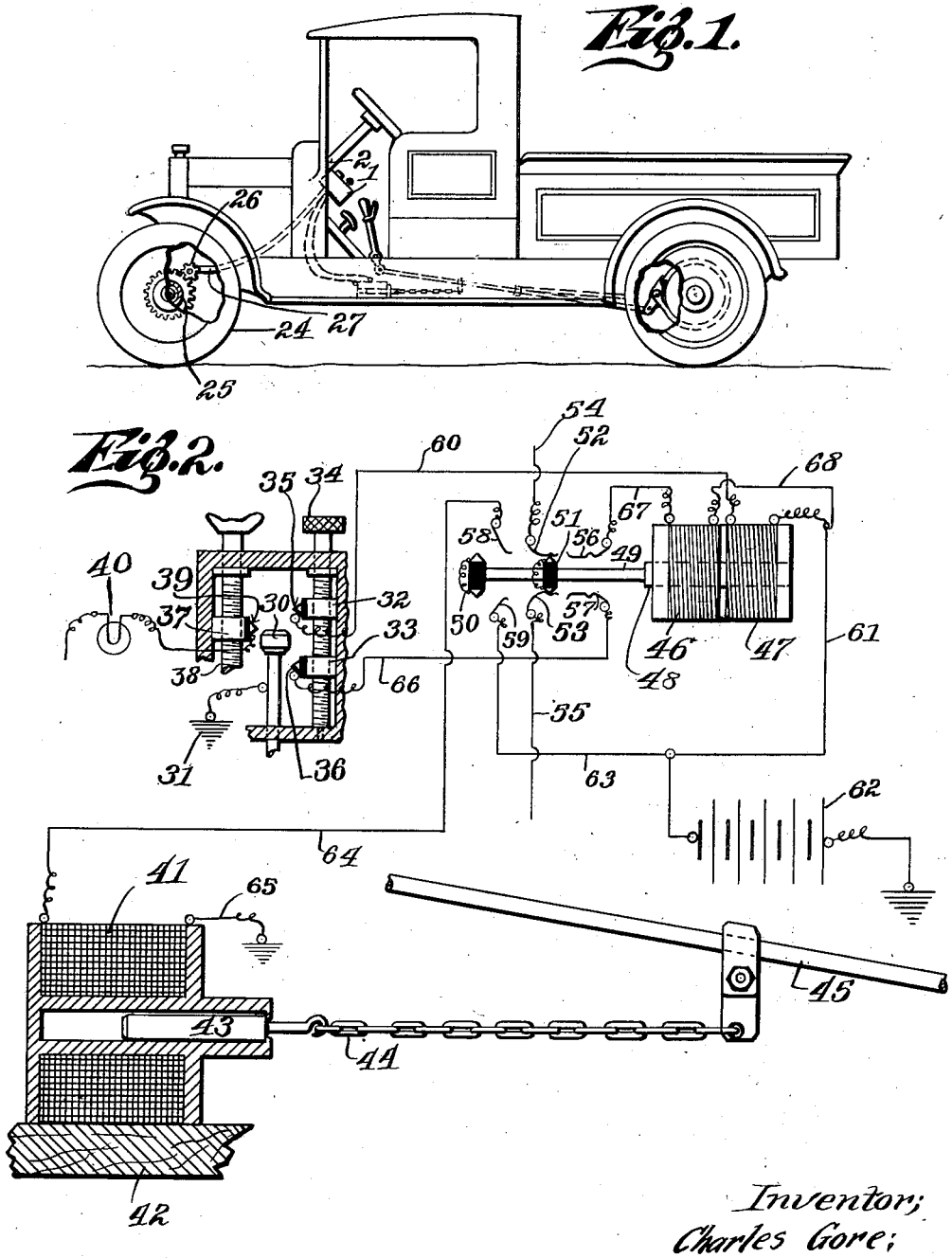

Patented Oct. 21, 1924.

1,512,167

UNITED STATES PATENT OFFICE.

CHARLES GORE, OF LOS ANGELES, CALIFORNIA.

SPEED ARRESTER FOR VEHICLES.

Application filed November 2, 1922. Serial No. 598,660.

*To all whom it may concern:*

Be it known that I, CHARLES GORE, a subject of the King of England, residing at Los Angeles, in the county of Los Angeles and State of California, have invented new and useful Improvements in a Speed Arrester for Vehicles, of which the following is a specification.

My invention relates to speed controls of the type shown in my co-pending applications for United States Letters Patent Ser. No. 576,835, filed July 22, 1922, and Ser. No. 595,432, filed Oct. 18, 1922, and consists of the novel features herein shown, described and claimed.

My object is to make an automatic device which will prevent motor vehicles, such as automobiles, trucks, street cars and the like, from exceeding the speed limit.

The drawings illustrate the invention.

Figure 1 is a side elevation of a motor vehicle provided with a speed control in accordance with the principles of my invention, parts of the vehicle being broken away to show the speed control construction and other parts of the speed control being shown in dotted lines.

Fig. 2 is a diagram of the parts and electrical circuits employed in the invention.

Fig. 3 is a sectional elevation of the speed control mechanism mounted in the box on the instrument board shown in Fig. 1.

Referring to the drawings in detail, the box 1 is mounted upon the instrument board or dash 2.

The back is securely fastened to the board 2. A bottom 4 and sides extend from the lower half of the back 3 and support an integral front 5, thus forming a well 6. A vertical bearing 7 is mounted near the bottom of the well 6 and a second vertical bearing 8 is mounted at the top of the well. An impeller shaft 9 is mounted in the bearings 7 and 8 and an impeller 10 is fixed upon the lower end of the shaft 9. A piston cylinder 11 is fixed in one side of the well 6 and the lower end of the cylinder 11 communicates with the well portion 12 below the bearing 7. A plate 13 supports the bearing 7 and covers the well portion 12, there being passages 14 through the center of the plate. The well 6 is to be filled with oil and the oil feeds downwardly to the center of the impeller 10 through the passages 14, and from the periphery of the impeller the oil goes through a passage 15 to the bottom of the cylinder 11 and up the cylinder and returns to the well 6 through a longitudinal slit 16 in the cylinder 11. A piston 17 operates in the cylinder 11 and is pressed downwardly by a spring 18. Normally the piston 17 is at the bottom of the cylinder 11 and closes the slit 16. A bevel gear 19 is fixed upon the upper end of the impeller shaft 9. Horizontal bearings 20 and 21 are fixed to opposite sides of the back 3, a shaft 22 is mounted in these bearings, and a bevel gear 23 connects the shaft 22 to the gear 19. The shaft 22 is connected to the vehicle wheel 24 by a gear 25, a pinion 26, and a flexible shaft construction 27, in the same manner as a speedometer is connected, so that when the vehicle runs the impeller wheel 10 is operated to force oil up the cylinder 11 and raise the piston 17, and the piston 17 will rise in proportion to the speed of the vehicle.

A stem 28 extends upwardly from the piston 17 through a bearing 29 and has a connector 30 on its upper end, said stem 28 being grounded upon the frame of the vehicle, as indicated at 31. Blocks 32 and 33 are mounted upon an adjusting screw 34 and properly spaced apart. Insulated contacts 35 and 36 are carried by the blocks 32 and 33 in positions to be engaged by the connector 30 as it moves up or down. A block 37 is mounted upon an adjusting screw 38 and carries an insulated contact 39 in position to be engaged by the connector 30, the contact 39 being in a horizontal plane between the contacts 35 and 36. An indicator light 40 is connected to the contact 39 so that when the connector 30 engages the contact 39 the light 40 will burn to show that the vehicle has nearly reached the speed limit.

A strong solenoid 41 is mounted upon the portion 42 of the vehicle frame and has a core 43 connected by a chain 44 to the brake pull rod 45, so that when the solenoid 41 is energized it will pull on the brake and retard the speed of the vehicle. Solenoids 46 and 47 are mounted in line and have a core in common 48 with a stem 49 and insulated connectors 50 and 51, so that when the solenoid 46 is energized the connectors 50 and 51 are moved to the left in Fig. 2 and when the solenoid 47 is energized the connectors 50 and 51 are moved to the right. Stationary yielding contacts 52 and 53 are mounted in position to be engaged by the connector 51 and the lines 54 and 55 of the motor spark plug circuit are connected to the contacts 52 and 53, so that when the solenoid 46 is energized the connector 51 completes the motor circuit to operate the engine, and so that when the solenoid 47 is energized the connector 51 is moved to break the motor circuit. Stationary spring contacts 56 and 57 are mounted at the right hand side of the contacts 52 and 53, and similar contacts 58 and 59 are mounted at the left hand side of the contacts 52 and 53, so that when the solenoid 47 is energized the connector 51 connects the contacts 56 and 57 and the connector 50 connects the contacts 58 and 59, and of course the motor circuit is broken. A line 60 connects the contact 35 to the solenoid 47 and a line 61 connects the solenoid 47 to the grounded battery 62, so that when the connector 30 engages the contact 35 the solenoid 47 is energized to break the motor circuit and move the connector 50 into engagement with the contacts 58 and 59. A line 63 connects the battery 62 to the contact 59, a line 64 connects the contact 58 to the brake operating solenoid 41, and the wire 65 grounds the solenoid 41, so that the brake is applied at the same time the motor circuit is broken. If the battery 62 furnished twelve amperes and the solenoid 47 uses two amperes the solenoid 41 will get ten amperes to pull the brake. A wire 66 connects the contact 36 to the contact 57, a wire 67 connects the contact 56 to the solenoid 46 and a wire 68 connects the solenoid 46 to the battery, so that when the connector 51 is between the contacts 56 and 57 and the connector 30 engages the contact 36 the solenoid 46 will be energized to move the connector 51 to restore the motor circuit and move the connector 50 to break the brake circuit.

Normally, when the motor is not running but is ready to start, the connector 30 is in engagement with the contact 36, the connector 51 is in engagement with the contacts 52 and 53 and the motor circuit closed and the brake circuit open. When the vehicle starts and attains a good speed the impeller 10 will operate the oil and raise the piston 17 thereby raising the connector 30, and when the vehicle nearly reaches the speed limit the connector 30 will engage the contact 39 and turn on the indicator light 40, and when the vehicle is about to exceed the speed limit the connector 30 will engage the contact 35 thereby energizing the solenoid 47 and breaking the motor circuit and closing the brake circuit, thus stopping the motor and applying the brake. As soon as the speed of the vehicle slackens enough the connector 30 will go down and break engagement with the contact 35 and then engage the contact 36 thus energizing the solenoid 46 which will move the connector 51 back to close the motor circuit and the engine will start again. Simultaneously the switch member 50 is withdrawn from the contacts 58 and 59 and the brake solenoid 41 is de-energized thus releasing the brake. It will thus be impossible for the vehicle to exceed the speed limit for which the parts are set.

The box 1 covers the mechanism mounted upon the board 2 and has a door 69 in its upper front part, the door 69 being controlled by the key lock 70, so that when the door is locked the adjustment of the screws 34 and 38 cannot be changed or the mechanism otherwise tampered with.

Thus I have produced a speed control for motor vehicles, the speed control being operated automatically and responsive to the speed, to give warning to the operator, to break the power circuit, to apply the brake, and to restore normal conditions.

Various changes may be made without departing from the spirit of my invention as claimed.

I claim:—

1. A speed control comprising a solenoid having means for breaking the power circuit, a second solenoid in circuit with the first solenoid and adapted for pulling a brake, a third solenoid having means for restoring the power circuit, and mechanism responsive to the vehicle speed for operating the solenoids.

2. In a speed control for vehicles having an ignition circuit, a switch for closing the ignition circuit, a solenoid, means controlled by said solenoid for applying a brake, a normally open switch controlling said solenoid, a pair of solenoids for actuating said switches, and means operable by the propulsion and speed of the vehicle acting on the increase of the velocity of the vehicle to a predetermined speed to energize one of said pair of solenoids whereby said switches will be operated to interrupt the ignition circuit and close the circuit to the brake solenoid, said means being operable on decrease of velocity of the vehicle below a predetermined speed, to energize the other solenoid of the pair of solenoids and thereby operate the switches to open the circuit to the brake solenoid and close the ignition circuit.

3. In a speed control for vehicles having an ignition circuit, a switch for closing the ignition circuit, a solenoid, means controlled by said solenoid for applying a brake, a normally open switch controlling said solenoid, a pair of solenoids for actuating said switches, means operable by the propulsion and speed of the vehicle acting on the increase of the velocity of the vehicle to a predetermined speed to energize one of said pair of solenoids whereby said switches will be operated to interrupt the ignition circuit and close the circuit to the brake solenoid, said means being operable on decrease of velocity of the vehicle below a predetermined speed, to energize the other solenoid of the pair of solenoids and thereby operate the switches to open the circuit to the brake solenoid and close the ignition circuit, and means for signaling when the vehicle is approaching the predetermined speed at which the ignition circuit will be open and the brakes applied.

4. In a device of the character described, a pair of spaced adjustable contact members, an intermediate contact member, a connector adapted to successively effect electrical connection with said contact, means for advancing said connector operable by the propulsion and speed of a vehicle, means for retracting said connector, a solenoid for operating the vehicle brakes, normally open switch controlling said solenoid, a switch normally closing the ignition circuit, means operable when the connector touches one of the spaced contact members to actuate said switches to break the ignition circuit and to energize the solenoid, a signal controlled by said intermediate contact member, and means controlled by the other spaced contact member for actuating said switches to close the ignition circuit and open the switch controlling the brake solenoid.

CHARLES GORE.